United States Patent Office 3,284,434
Patented Nov. 8, 1966

3,284,434
PROTEIN ISOLATION AND PREPARATIONS
Gerald Bonar Sutherland, Lawrence, Kans., assignor to Kansas University Endowment Association, Lawrence, Kans., a corporation of Kansas
No Drawing. Filed Aug. 29, 1960, Ser. No. 52,367
7 Claims. (Cl. 260—112)

This invention relates to a method and composition for use in the detection and identification of disease of the type based upon deficiencies of one or more proteins and/or the presence of one or more diseased or abnormal proteins in diseased tissue or serum.

In accordance with the teachings of Dr. Linus Pauling and others (Pauling's Molecular Disease Hypothesis, Harvey Lectures, 49:216, 1953–54), abnormal protein patterns are believed responsible for many diseased conditions of a serious nature. Isolation of proteins associated with such disease would not only permit study thereof but would, in turn, also provide more positive means for identification of such disease or diseases.

It will be understood that the concepts of this invention are not addressed to the identification or detection, of any particular disease but instead are addressed more broadly to the identification and detection of protein deficiencies or abnormal protein which might be the cause of the disease.

It is an object of this invention to provide a method for detection or identification of abnormalcy in protein patterns within the human system such as in diseased tissue or serum.

The concepts of this invention are capable of a number of ramifications. They are based, however, on the isolation of particular proteins, as a means for determination of the proteins deficient in the human system when such deficiency results in an abnormal protein pattern that interferes with the normal functions of the human system or leads to a diseased condition therein; or as a means for determination and identification of proteins abnormally present in the human system, in a diseased state or otherwise, when such abnormal protein interferes with the normal function of the human system or is responsible for a diseased condition therein. The various ramifications following isolation will hereinafter be set forth by way of utilization of the isolated protein.

The commonly used methods of protein isolation depend for their action on such physical-chemical properties of the proteins as differential solubility, electrophoretic mobility, or sedimentation velocity in a centrifugal field. These methods, while highly valuable, have a disadvantage that they are totally unrelated to the biological properties of the proteins and therefore the proteins isolated by these methods may in no way be responsible for the particular condition such that preparation of an antiserum containing corresponding antibodies may serve to destroy desirable components of the protein pattern with or without effect on the abnormal protein with the possibility of doing greater harm than good.

It would be desirable and it is an object of this invention to provide a method of protein isolation based upon a biological property of the protein, a method which is both simple and direct and which is highly specific in terms of the biological property to be investigated.

The procedure is based upon the ability to isolate a protein present in one system by reference to another system identical with the first with the exception of the particular protein. Thus, in the case of a deficiency with respect to one of the many proteins in the human system, the procedure is based upon the ability to isolate the protein in the human system which is present in normal tissue or serum and deficient in the tissue or serum in question thereby to identify the deficiency without the need to identify the particular protein or the structure thereof.

Similarly and more important, in the case of a disease protein or other protein strange to the protein pattern in serum or tissue, the procedure is based upon the isolation of the protein abnormally present in the protein system thereby to enable identification and detection of the disease or abnormalcy, as will hereinafter appear, without the need for identification of the particular diseased or other protein or the structure thereof. Having isolated the abnormal protein in the system, it becomes possible to prepare an antiserum containing antibodies.

Having set forth a prerequisite in the practice of this invention, the procedure for isolation of an abnormal protein present in a standard protein pattern may be outlined as follows:

(1) The serum containing the unidentified abnormal protein is injected into an animal, such as a rabbit, to build up an antiserum.

(2) The antiserum is then combined with the serum of a standard wherein each protein in the standard exhaustively absorbs the corresponding antibody of the antiserum to form a precipitate or permanently soluble complexes leaving as the only precipitatable antibody, the antibody for the particular protein abnormally present in the system in question.

(3) After separation of the precipitate, the serum containing the unidentified abnormal protein is added to the remaining antiserum whereby the antibody of the abnormal protein is adsorbed onto the abnormal protein of the serum to form a precipitate formed solely of the abnormal protein and its antibody.

(4) The precipitate obtained by step 3 is washed and coagulated to render it insoluble without destroying all of its combining sites such that the insolubilized antibody can still be used as a specific adsorbent for further amounts of antigen or abnormal protein from the original serum in question.

(5) The coagulum is added to the serum containing the abnormal protein for adsorption of additional abnormal protein.

(6) The coagulum, with its adsorbed protein is first washed and then adjusted to a pH of about 3 whereby the adsorbed abnormal protein becomes freed from the coagulum.

(7) The coagulum is then separated, as by means of a centrifuge, leaving the abnormal protein present in a high state of purity in the supernatant liquid.

Steps 4, 5 and 6 represent concepts important to the procedure for isolation. In step 4, the antibody is rendered insoluble by coagulation without destroying all of its combining sites whereby a complex is still capable of being formed by the coagulated antibody and the further amounts of specific antigen in serum, which complex can subsequently be disassociated by pH adjustment to free the abnormal protein in a relatively pure state.

Having broadly defined the concepts of this invention for the isolation of a protein factor present in one of two otherwise identical protein systems, illustration will now be made of a specific example of the application of this method by reference to the isolation of ovalbumin present as an additional protein in an otherwise standard serum. For this purpose use was made of a dog serum divided into two aliquots of 200 and 300 milliliters respectively. The ovalbumin was added to the 300 milliliter aliquot in a concentration of about 0.85 mg./ml.

The mixture of ovalbumin and serum will hereinafter be referred to as complete mixture A containing the additional protein whereas the unadulterated serum will be referred to as the incomplete mixture B. The objective for illustrating the practice of this invention is to remove and purify ovalbumin from the complete mixture A by immunochemical techniques.

*Example 1*

Step 1.—One milliliter units of the complete mixture A were injected intravenously into rabbits three times a week for three weeks. About seven days after the last injection, the rabbits were bled. The blood was allowed to clot for twenty hours and the clot was removed as by centrifuge and the supernatant liquid was decanted off. This liquid, hereinafter referred to as complete antiserum A, possesses antibodies directed against the protein components of the complete mixture A including an antibody directed specifically against ovalbumin.

Step 2.—Five milliliters of incomplete mixture B was added to 200 milliliters of complete antiserum A and the mixture was reacted at room temperature for two hours with constant stirring and thereafter stored in a refrigerator for an additional twenty-two hours. The antibodies to the protein components present in the incomplete mixture B are thus either removed as a precipitate or otherwise rendered permanently soluble by formation of soluble complexes, leaving only the antibody for ovalbumin in a precipitatable state in the mixture. The formed precipitates were removed as by means of a centrifuge or filter. Additional small increments of incomplete mixture B were added and the procedure repeated until further additions of incomplete mixture B produced no further precipitation, indicating complete removal of all precipitatable antibodies to the proteins in the incomplete mixture B, or the rendering of such antibodies permanently soluble by formation of soluble complexes.

A quantitative precipitin analysis of the remaining antiserum can be carried out to determine the titre of the antiserum to ovalbumin. In the foregoing example, the amount of antibody to ovalbumin was calculated as requiring 8.5 milligrams of ovalbumin to precipitate all of the antibody at the point of maximum precipitation.

Step 3.—An amount of complete mixture A containing about 8.5 milligrams of ovalbumin is incorporated with the antiserum remaining from step 2 to form a precipitate of ovalbumin and its antibody. The precipitate is separated and washed a number of times (five times) with a dilute solution of sodium chloride, such as a 1 percent solution.

Step 4.—The washed precipitate is rendered permanently insoluble by coagulation by treatment with 50 milliliters of a solution containing 90 percent by volume ethanol in water. The precipitate was suspended in the ethanol solution by constant stirring for about one hour at 30° C. The coagulating solution of ethanol was then removed with repeated washings by repeated suspension in dilute solutions, such as 1 percent sodium chloride in water, followed by centrifugation after which the precipitate was washed repeatedly (three times) at pH 3 in a 0.05 molar glycine-HCl buffer and three times at pH 7.

Step 5.—The coagulum of step 4 is then suspended by constant stirring for about two hours in 20 cc. of complete mixture A. The ovalbumin in complete mixture A is adsorbed or otherwise reacts with the antibody in the coagulum to form a complex. All excess and other proteins are removed by repeated washings (five times), as by suspension in saline and centrifugation. The precipitate will be found to be formed of the coagulated antibody and antigen plus one coagulated antigen (ovalbumin) which has been specifically adsorbed by the specific coagulum.

Step 6.—The undenatured ovalbumin or antigen adsorbed or otherwise complexed with the coagulum is disassociated by the addition of 5 milliliters of 0.05 molar glycine-HCl buffer to reduce the pH to about 3. After about two hours at room temperature with constant stirring and overnight storage in the refrigerator, the coagulum is separated as by means of a centrifuge or filtration, to leave the uncoagulated antigen (ovalbumin) in a relatively pure state in the supernatant liquid.

The antigen can be tested by quantitative precipitation techniques after the careful addition of NaOH solution to adjust the pH to 7 and it can be tested for total protein content by biuret test. The product of step 6 was found to contain 70 milligrams of ovalbumin and less than 55 milligrams nonspecific proteins which corresponds to more than a 38-fold increase in the purity of ovalbumin over and above the complete mixture A.

The coagulum of step 4 can be used again and again for elution of further antigen from the complete mixture A for separating additional amounts of the purified antigen for subsequent use.

Step 7.—The purified antigen of step 6 is injected into rabbits, as in accordance with step 1, to produce an antiserum, after clotting and removal of the blood, containing antibodies specific to ovalbumin in a purity which is far greater than the antiserum remaining from step 2, wherein the complete antiserum A is combined with the complete mixture A to remove all precipitatable antibodies with the exception of the antibodies specific to ovalbumin.

It will be understood that the ovalbumin employed in the foregoing example is merely representative of a protein present in a system or protein pattern (complete mixture A) and absent in another system or protein pattern otherwise identical (incomplete mixture B). For example, the ovalbumin can instead be a diseased protein present in diseased tissue or serum whereby the only difference between the standard protein pattern of the tissue or serum and the diseased tissue or serum resides in the presence of the additional diseased protein which may be the cause of the ailment or disease. By the process of this invention, the diseased protein can be isolated by immunochemical technique and an antiserum containing antibodies specific to the diseased protein can be produced.

For example, the inventive concepts may be applied in the contrast between normal human serum and the serum of an agammaglobulinemic patient where the gamma globulin is absent. In such instance, the serum of the agammaglobulinemic patient would constitute the component referred to as the incomplete mixture B in Example 1 while the normal human serum would constitute the component referred to as the complete mixture A in carrying out the process of Example 1. Otherwise, the process would be, for the most part, the same, with purified gamma globulin and an antiserum containing antibody specific to gamma globulin being secured. Further, normal serum can be contrasted with serum containing Bence-Jones protein where the abnormal Bence-Jones protein is the additional protein factor the remaining components being identical in each. Under such circumstances, in Example 1, the serum containing the abnormal Bence-Jones protein would constitute the complete mixture A and the normal serum would constitute the incomplete mixture B.

The examples need not be as dramatic or as simple as the foregoing since there are many disease conditions, both acquired and hereditary, where normal proteins are lacking or where abnormal proteins appear. Where a protein deficiency exists, the serum possessing the deficiency is contrasted to a normal serum where, in the application of the process as defined in Example 1, the normal serum would be the complete mixture A while the serum wherein a protein deficiency exists would be the incomplete mixture B. The protein remaining after step 6 of Example 1 would represent the protein which is deficient in the serum of the incomplete mixture B.

While, to the present, the invention has been described as applied to the illustration of a protein present in only one of two otherwise identical protein systems, it will be apparent that the concepts of this invention can be equally employed for the illustration of two or more proteins where such additional proteins are present in only one of two otherwise identical protein systems. In such instance, the proteins strange to the one of two otherwise identical systems will be separated together in step 6 and the antiserum secured by step 7 of Example 1 would contain antibodies specific to the particular proteins. In Example 1, the serum containing the additional proteins, known or unknown, abnormal or diseased, would constitute the complete mixture A while the other identical with the complete mixture A except for the strange proteins would constitute the incomplete mixture B.

Coagulants capable of coagulation of the antibody without destroying the ability of the congulated antibody specifically to absorb antigen (protein) at pH 7 and subsequently to release it at pH 3, include such materials as ethanol, acetone, hydrochloric acid, sulfuric acid, aluminum chloride, chromic chloride and heat, any one of which can be substituted for the ethanol in Example 1. It will be understood that other coagulating agents can be used.

The amount of ethanol or other coagulant used to coagulate the antibody may be varied over a fairly wide range, and likewise the other variables in the coagulation process, e.g., heat, pH, time, etc., may also be varied. They are, however, mutually dependent, so that an alteration in one will necessitate a compensatory alteration in another if optimum conditions are to be maintained.

Tests have indicated that the coagulated antigen-antibody complex remains as an absorbent for specific antigen substantially independently of the time temperature or means for coagulation. Cross-adsorption studies indicate that no detectable cross-adsorption occurs or else such cross-adsorbed antigen is not released upon subsequent adjustment to pH 3.

The yield of antigen from the coagulated antibody has been found to depend on the quantity of the coagulated antibody present and the number of undenatured (or unmasked) combining sites per unit of antibody.

An important concept of this invention resides in the adaptation of this invention to a diagnostic procedure. By way of illustration, a disease A can be related to an abnormal protein A which could be illustrated in accordance with the practice of this invention. An ailment B would be related to abnormal protein B; ailment C can be related to abnormal protein C, etc. After having illustrated the various proteins, a separate antiserum can be prepared containing precipitable antibodies against each of the isolated proteins.

Where a disease is suspected, diagnosis can be achieved for more positive identification thereof by extraction of serum from the patient. The patient's serum can then be combined as by addition to one or a number of the antiserums. The formation of a precipitate in any one would indicate the presence of a protein in the patient's serum corresponding to the protein specific to the particular antiserum in which a precipitate is secured thereby to indicate the presence of the corresponding disease or ailment. Under such circumstances, the various test antisera would constitute a product of manufacture.

In each instance, as a diagnostic tool, an article of manufacture is made available for each disease or ailment without the need for positive identification of the disease, the abnormal protein or the antiserum.

It will be apparent from the foregoing that I have provided an effective method and materials for isolation of proteins from diseased or otherwise tissue or serum for use in the identification, of various diseases to which the protein might be directly or indirectly responsible. It will be understood that changes may be made in the details of carrying out the steps of the described invention and in the materials and methods employed therein without departing from the spirit of the invention, especially as defined in the following claims.

I claim:

1. The process of separating a protein (antigen) from a protein system in one of two otherwise identical protein systems comprising the steps of producing an antiserum to the one protein system, adding the other protein system to the antiserum to leave the antibody directed to the antigen as the only precipitatable antibody remaining in the antiserum, adding the one protein system to the remaining antiserum to precipitate the antibody-antigen, coagulating the precipitated antibody, exposing the coagulated antibody to the one protein system whereby antigen directed to the antibody is removed on the coagulated antibody to form a complex, separating the complex, and acidifying to free the antigen from the coagulated antibody and separating the antigen from the coagulated antibody.

2. The process of separation of a protein (antigen) from a protein system in one of two otherwise identical protein systems comprising the steps of producing an antiserum of the one protein system, adding the other protein system to the antiserum to leave the antibody directed to the antigen as the only precipitatable antibody remaining in the antiserum, separating the antiserum from any insolubles therein, adding the one protein system to the remaining antiserum to precipitate the antibody-antigen, separating the precipitate, coagulating the precipitated antibody-antigen, exposing the coagulated antibody to the one protein system whereby antigen directed to the antibody is removed on the coagulated antibody, separating the coagulated antibody with the antigen, adjusting the pH to the acid side to free the antigen from the coagulated antibody, and separating the antigen from the antibody.

3. The process as claimed in claim 2 in which the coagulated antibody is exposed to the one protein system at a pH of about 7.

4. The process as claimed in claim 2 in which acidification to free the antigen from the coagulated antibody is within the range of about pH 3.

5. The process of producing an antiserum directed to a protein (antigen) from a protein system in one of two otherwise identical protein systems comprising the steps of producing an antiserum of the one protein system, adding the other protein system to the antiserum to leave the antibody directed to the antigen as the only precipitatable antibody remaining in the antiserum, adding the one protein system to the remaining antiserum to precipitate the antibody-antigen, coagulating the precipitated antibody, exposing the coagulated antibody to the one protein system whereby antigen directed to the antibody is removed on the coagulated antibody to form a complex, separating the complex, acidifying to free the antigen from the coagulated antibody, separating the antigen from the coagulated antibody, and injecting the separated antigen into an animal to produce antiserum containing an antibody directed to the antigen.

6. The process of producing an antiserum directed to a protein (antigen) from a protein system in one of two otherwise identical protein systems comprising the steps of producing an antiserum of the one protein system, adding the other protein system to the antiserum to leave the antibody directed to the antigen as the only precipitatable antibody remaining in the antiserum, separating the antiserum from any insolubles therein, adding the one protein system to the remaining antiserum to precipitate the antibody-antigen, separating the precipitate, coagulating the precipitated antibody-antigen, exposing the coagulated antibody to the one protein system whereby antigen directed to the antibody is removed on the coagulated antibody, separating the coagulated antibody with the antigen, adjusting the pH to the acid side to free the antigen from the coagulated antibody, separating the antigen from the antibody, and injecting the separated antigen into an animal to produce an antiserum containing an antibody directed to the antigen.

7. The process of separating at least one antigen from a protein system in one of two otherwise identical protein systems comprising the steps of producing an antiserum to the one protein system, adding the other protein system to the antiserum to leave the antibody directed to the antigen as the only precipitatable antibody remaining in the antiserum, adding the one protein system to the remaining antiserum to precipitate the antibody-antigen, coagulating the precipitated antibody to produce a coagulated antibody having combining sites for said one antigen thereon, exposing the coagulated antibody to the one protein system whereby antigen directed to the antibody is removed on the coagulated antibody to form a complex, separating the complex, and acidifying to free the antigen from the coagulated antibody and separating the antigen from the coagulated antibody.

References Cited by the Examiner

UNITED STATES PATENTS 2,454,752  11/1948  Coca _____ 167—78

OTHER REFERENCES

A Manual of Blood Grouping and Rh Typing Serum, pp. 24 and 25, pub. by Hyland Labs, 1956, Los Angeles, Calif.

Bjorklund, Proc. Soc. Exp. Biol. and Med., January 1960, pp. 1–4.

Bruton, Pediatrics, 9 (6): 722–728, June 1952.

Bruton et al., A.M.A. Am. J. Dis. Child., 84: 632–636 (1952).

Cochrane, J. Exp. Med., 591–604, Nov. 1, 1958.

Collier et al., New Eng. J. Med., 248: 409–414, Mar. 15, 1953.

Gitlin et al., J. Clin. Invest., 35: 1199–1204 (1956).

Gitlin et al., Scientific American, 197 (1): 93, 94, 96, 98, 100, 102, 104, July 1957.

Gitlin et al., New Eng. J. Med., 260 (1): 21–27, Jan. 1, 1959.

Gitlin et al., New Eng. J. Med., 260 (2): 72–76, Jan. 8, 1959.

Gross et al., New Eng. J. Med., 260 (3): 121–125, Jan. 15, 1959.

Gross et al., New Eng. J. Med., 260 (4): 170–178, Jan. 22, 1959.

Janeway et al., Trans. Assn. Am. Physicians, 66: 200–202 (1953).

Pauling, Chem. and Eng. News, Apr. 25, 1946, pp. 1046–1065.

Wiener, Am. J. Clin. Path., 25: 595–597 (1955).

ELBERT L. ROBERTS, *Acting Primary Examiner.*

MORRIS O. WOLK, LEWIS GOTTS, *Examiners.*

D. LEVY, S. K. ROSE, *Assistant Examiners.*